(12) United States Patent
Kotani

(10) Patent No.: US 7,813,862 B2
(45) Date of Patent: Oct. 12, 2010

(54) HYBRID VEHICLE

(75) Inventor: Takeshi Kotani, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 465 days.

(21) Appl. No.: 11/662,952

(22) PCT Filed: Sep. 20, 2005

(86) PCT No.: PCT/IB2005/002780

§ 371 (c)(1),
(2), (4) Date: Mar. 20, 2007

(87) PCT Pub. No.: WO2006/032976

PCT Pub. Date: Mar. 30, 2006

(65) Prior Publication Data

US 2008/0000700 A1    Jan. 3, 2008

(30) Foreign Application Priority Data

Sep. 21, 2004    (JP)    ............................. 2004-272915

(51) Int. Cl.
*B60L 11/02* (2006.01)
*B60K 6/00* (2007.10)
*F02D 41/04* (2006.01)
(52) U.S. Cl. ..................................... 701/103; 180/65.21
(58) Field of Classification Search ......... 701/103–105, 701/70, 99; 477/3–5, 70; 180/65.2, 65.4, 180/65.21, 65.1, 65.31, 65.28
See application file for complete search history.

(56) References Cited

U.S. PATENT DOCUMENTS 5,722,359 A    3/1998    Chubachi et al.

| | | | |
|---|---|---|---|
| 6,625,524 B2* | 9/2003 | Yamaguchi et al. | 701/22 |
| 6,702,053 B2* | 3/2004 | Nogi et al. | 701/99 |
| 7,226,385 B2* | 6/2007 | Tabata et al. | 477/5 |

(Continued)

FOREIGN PATENT DOCUMENTS

JP    Y2 7-41880    9/1995

(Continued)

OTHER PUBLICATIONS

Notification of the First Office Action for Chinese Application No. 200580031813.6; mailed Mar. 18, 2010 (with translation).

(Continued)

*Primary Examiner*—Hieu T Vo
(74) *Attorney, Agent, or Firm*—Oliff & Berridge, PLC

(57) ABSTRACT

A hybrid vehicle is provided, in which lean limit operation of an engine can be achieved while consumption of electric power of a battery is suppressed when a change of engine torque in the vicinity of a lean limit is suppressed or when an air-fuel ratio is controlled so as to come close to a lean limit during engine operation. The hybrid vehicle, in which an engine, a motor-generator, and a drive wheel are mutually connected via a differential connection unit, includes a control device which maintains an output of the engine at a constant level by increasing/decreasing an engine rotational speed and decreasing/increasing a rotational speed of the motor-generator in accordance with a decrease/increase of the engine torque in the vicinity of the lean limit.

19 Claims, 3 Drawing Sheets

U.S. PATENT DOCUMENTS

2002/0070060 A1    6/2002   Nogi et al.
2007/0155584 A1*   7/2007   Tabata et al. ................. 477/70

FOREIGN PATENT DOCUMENTS

| JP | A-9-195812 | 7/1997 |
|----|------------|--------|
| JP | A-10-212983 | 8/1998 |
| JP | 2000-102108 A * | 4/2000 |
| JP | B2 3286517 | 5/2002 |
| JP | B2 3289361 | 6/2002 |
| JP | B2 3307015 | 7/2002 |
| JP | A-2004-156505 | 6/2004 |

OTHER PUBLICATIONS

Notification of Reasons for Refusal for Japanese Application No. 2004-272915; mailed Jun. 7, 2006 (with translation).

* cited by examiner

HYBRID VEHICLE

BACKGROUND OF THE INVENTION

1. Field of the Invention

The invention relates to a hybrid vehicle in which lean operation of an engine can be achieved at an air-fuel ratio higher than a stoichiometric air-fuel ratio. More specifically, the invention relates to a hybrid vehicle in which lean limit operation of an engine can be achieved while consumption of electric power of a battery is effectively suppressed.

2. Description of the Related Art

It is known that lean operation of an engine at an air-fuel ratio higher than a stoichiometric air-fuel ratio improves fuel efficiency. The fuel efficiency is gradually increased in an initial stage as the air-fuel ratio is increased from the stoichiometric air-fuel ratio. However, if the air-fuel ratio is extremely increased, a change amount of engine torque is increased, which makes rotation in the engine unstable, and deteriorates the fuel efficiency after all. Until the air-fuel ratio is increased to reach a limit, the fuel efficiency can be increased while a change amount of the engine torque is suppressed to be equal to or smaller than a permissible limit value. This limit is referred to as "a lean limit". Various technologies relating to operation of an engine in the vicinity of a lean limit are proposed.

Japanese Patent No. 3289361 discloses a technology in which when an engine for electric power generation is operated in an electric vehicle, a change amount of engine torque is detected based on an output of an electric generator; and an air-fuel ratio of an engine is increased to a lean limit while determining whether the change amount of the engine torque is equal to or smaller than a value corresponding to a predetermined lean limit of the air-fuel ratio of the engine. Also, Japanese Patent No. 3307015 discloses a technology in which as operation control of a lean burn engine for a vehicle, a combustion pressure of an engine is detected; and when a change amount of the combustion pressure exceeds a predetermined value corresponding to a predetermined lean limit, a change in engine torque is suppressed using an electric motor. Also, Japanese Utility Model Application Publication No. 7-41880 discloses a technology in which in an engine using gas as fuel, an engine rotational speed is caused to come close to a target rotational speed; when the engine rotational speed matches the target engine rotational speed, a cross sectional area of a gas passage is adjusted so that the air-fuel ratio of air-fuel mixture becomes lean; and a decrease in the engine rotational speed caused by the operation of the engine at a lean air-fuel ratio is compensated for by adjusting a throttle valve opening amount. Also, Japanese Patent No. 3286517 discloses a technology in which in a vehicle including a lean burn engine and a continuously variable transmission, the continuously variable transmission is controlled according to an operating state of the vehicle so that an engine rotational speed becomes equal to a target engine rotational speed; and the target engine rotational speed is set to a value corresponding to a lean limit.

In a drive system of a hybrid vehicle that is employed by the applicant of the invention, an engine, a first motor-generator, a drive wheel are mutually connected via differential connection means; and a second motor-generator is connected to the drive wheel. In a case where this drive system is operated in the vicinity of a lean limit, a convenient method is as follows. A change amount of engine torque is detected using the first motor-generator, and using the drive wheel as a stable torque support member; and when the change amount of the engine torque exceeds a predetermined limit value, the change in the engine torque is compensated for using the second motor-generator, whereby a lean limit is controlled. This method is actually employed.

However, when the engine torque changes in the vicinity of the lean limit, the engine torque becomes intermittently insufficient. Therefore, the change in the engine torque is compensated for using the second motor-generator. Since the change in the engine torque is compensated for by operating the second motor-generator as a motor, electric power of a battery is consumed. Also, even in the case of lean operation of the engine, the engine cannot be operated at a lean air-fuel ratio in the initial stage when the engine is started. Therefore, the engine is always started in a rich state, that is, at an air fuel ratio equal to or lower than the stoichiometric air-fuel ratio. Then, after warming-up of the engine has proceeded to a certain extent, and the rotation in the engine has become stable, the air-fuel ratio is gradually increased so that the engine starts to be operated at a lean air-fuel ratio. However, since the engine torque is decreased with an increase in the air-fuel ratio, when the air-fuel ratio is increased toward a lean limit during the engine operation, the second motor-generator needs to be operated. Since the second motor-generator is operated, the electric power of the battery is further consumed.

When the vehicle is stably driven in a constant running state by the engine, the vehicle receives a constant output (power) from the engine. The output of the engine is a product of the torque and the rotational speed. Therefore, when the engine torque is decreased, if the engine rotational speed is increased with a decrease in the engine torque, the engine output can be maintained at a constant level. Accordingly, in the case where the vehicle includes a drive system in which the engine, the motor-generator, and the drive wheel are mutually connected via the differential connection means, when the engine torque is intermittently decreased in a lean operation region, or when the engine torque is gradually decreased with an increase in the air-fuel ratio toward a lean limit during the engine operation, the decrease in the engine torque should be able to be compensated for by increasing the engine rotational speed without changing the rotational speed of the drive wheel even if means such as the second motor-generator is not used.

SUMMARY OF THE INVENTION

On the basis of the aforementioned concept, the invention is made. It is an object of the invention to provide a hybrid vehicle in which lean operation of an engine can be achieved while consumption of electric power of a battery is effectively suppressed.

The invention relates to a hybrid vehicle in which an engine, a motor-generator, and a drive wheel are mutually connected via differential connection means. The hybrid vehicle includes a control device which performs lean limit control of the engine, and which maintains an output of the engine at a constant level by increasing/decreasing an engine rotational speed and decreasing/increasing a rotational speed of the motor-generator in accordance with a decrease/increase in engine torque. Also, another aspect of the invention relates to a hybrid vehicle including an differential connection portion which mutually connects an engine, a motor-generator, and a drive wheel; and a control device which performs lean limit control of the engine, and which maintains an output of the engine at a constant level by increasing/decreasing an engine rotational speed and decreasing/increasing a rotational speed of the motor-generator in accordance with a decrease/increase in engine torque. The phrase "by increasing/decreasing an engine rotational speed and decreasing/increasing a rotational speed of the motor-generator in accordance with a decrease/increase in engine torque" signifies as follows. The engine rotational speed is increased and the rotational speed of the motor-generator is decreased in accordance with the decrease in the engine torque. Also, the engine rotational speed is decreased and the rotational speed of the motor-generator is increased in accordance with the increase in the engine torque.

In the hybrid vehicle according to the invention, when a change amount of the engine torque is equal to or smaller than a predetermined first limit value, the control device may gradually increase an air-fuel ratio in a lean region and gradually increase the engine rotational speed at the same time. In this case, when the change amount of the engine torque is equal to or larger than a predetermined second limit value which is larger than the first limit value, the control device may gradually decrease the air-fuel ratio in the lean region and gradually decrease the engine rotational speed at the same time.

Further, when the change amount of the engine torque is equal to or smaller than the first limit value, the control device may gradually increase the air-fuel ratio and the engine rotational speed on a condition that a change rate of an accelerator pedal operation amount is equal to or smaller than a predetermined limit value.

The control device may determine that the change amount of the engine torque is equal to or smaller than the first limit value based on a fact that an accumulated value is equal to or smaller than a predetermined limit value, the accumulated value being obtained by accumulating, during a predetermined detection period, an absolute value of the change amount of the engine torque in a predetermined time.

The engine torque may be decreased with an increase in an air-fuel ratio in a lean region, and the engine torque may be increased with a decrease in the air-fuel ratio in the lean region.

As described above, in the case where the engine torque is decreased, if the engine rotational speed is increased in accordance with the decrease in the engine torque, the engine output can be maintained at a constant level. Meanwhile, in the case where the engine, the motor-generator, and the drive wheel are mutually connected via the differential connection means, if the rotational speed of the motor-generator is decreased in accordance with an increase in the engine rotational speed, the engine rotational speed can be increased while the rotational speed of the drive wheel is maintained at a constant level. Accordingly, in the case where the engine is operated in the vicinity of the lean limit, or the air-fuel ratio is caused to come close to the lean limit, and therefore the engine operation becomes unstable and the engine output torque is decreased, the drive wheel can be maintained in a constant state by increasing the engine rotational speed in accordance with the decrease in the engine torque, even if the decrease in the engine torque is not compensated for using the battery.

In this case, when the change amount of the engine torque is equal to or smaller than the predetermined first limit value, a lean degree is gradually increased and the engine rotational speed is gradually increased at the same time. Thus, lean limit operation can be achieved by setting the first limit value to the maximum permissible change amount of the engine torque. Further, when the change amount of the engine torque is equal to or larger than the second limit value which is larger than the first limit value, the lean degree is gradually decreased and the engine rotational speed is gradually decreased at the same time. Thus, if the air-fuel ratio exceeds the lean limit due to external disturbance, the air-fuel ratio can be decreased so as to be smaller than the lean limit. At this time, when setting an amount by which the second limit value is larger than the first limit value, lean operation can be achieved in the vicinity of the lean limit using appropriate hysteresis.

As described later in description of an embodiment, this kind of gradual increase/decrease control can be performed by a microcomputer by repeatedly performing computations in a cycle of several tens milliseconds to several hundreds milliseconds. Thus, since the lean degree is gradually increased and the engine rotational speed is gradually increased at the same time, or the lean degree is gradually decreased and the engine rotational speed is gradually decreased at the same time by the gradual increase/decrease control as described above, the air-fuel ratio during the engine operation can be changed from a value in a stoichiometric air-fuel ratio region to a value in the vicinity of the lean limit, and the change in the engine torque can be suppressed during the engine operation in a lean limit region.

Also, in the case where when the change amount of the engine torque is equal to or smaller than the first limit value, the lean degree is gradually increased and the engine rotational speed is gradually increased at the same time on the condition that the change rate of the accelerator pedal operation amount is equal to or smaller than the predetermined value, lean limit operation can be performed only when an output requested of the engine is stable to a certain extent during operation of the vehicle. Thus, it is possible to avoid the situation in which stability of the running vehicle is carelessly decreased by lean limit operation of the engine. Accordingly, it is possible to obtain the effect of improving fuel efficiency.

BRIEF DESCRIPTION OF THE DRAWINGS

The above mentioned embodiment and other embodiments, objects, features, advantages, technical and industrial significance of this invention will be better understood by reading the following detailed description of the exemplary embodiment of the invention, when considered in connection with the accompanying drawings, in which.

DETAILED DESCRIPTION OF THE EXEMPLARY EMBODIMENTS

In the following description, the present invention will be described in more detail in terms of exemplary embodiment.

Figure 1:
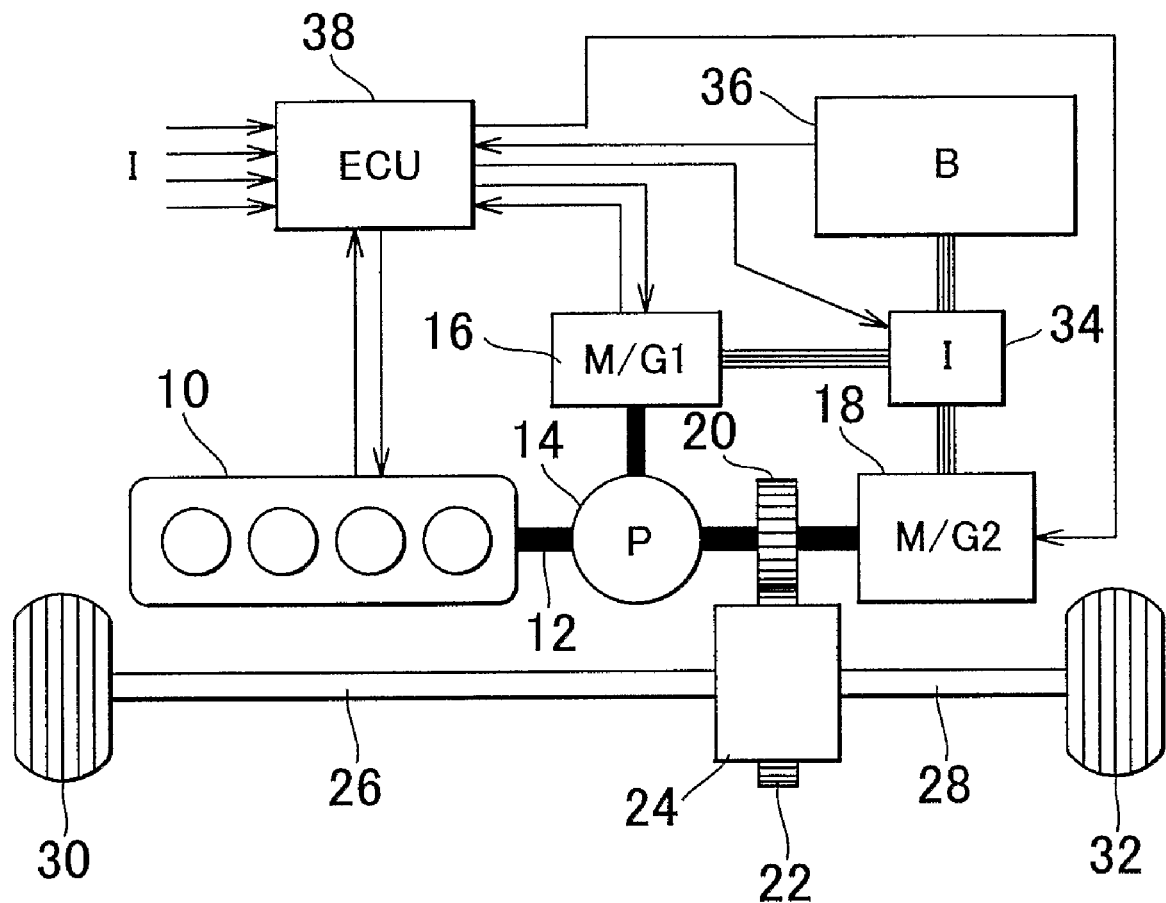
FIG. 1 is a schematic diagram showing a drive system of a hybrid vehicle according to the invention.

FIG. 1 is a schematic diagram showing a drive system of a hybrid vehicle according to the invention. A main portion of the invention incorporated into a control portion which controls the drive system as software. Therefore, an external appearance structure of the drive system shown in FIG. 1 is already known. In FIG. 1, an engine 10 is a four-cylinder engine in this example. An output shaft (crank shaft) 12 of the engine 10 is connected to one of three rotation elements of a planetary gear unit 14. The other two rotation elements of the planetary gear unit 14 are connected to a first motor-generator (MG1) 16 and a second motor-generator (MG2) 18, respectively. A gear 20 is provided on a shaft connecting the planetary gear unit 14 to the second motor-generator (MG2) 18. A gear 22 engaged with the gear 20 drives a pair of drive wheels 30, 32 via a differential gear unit 24 and axles 26, 28. Thus, the engine 10, the first motor-generator (MG1) 16, and the drive wheels 30, 32 are mutually connected via the planetary gear unit 14 which serves as differential connection means. The first motor-generator (MG1) 16 and the second motor-generator (MG2) 18 are electrically connected to a battery 36 via an inverter 34. Each of the first motor-generator (MG1) 16 and the second motor-generator (MG2) 18 is supplied with electric current from the battery 36, or charges the battery 36 according to an operating state of the vehicle.

Operation of each of the engine 10, the first motor-generator (MG1) 16, the second motor-generator (MG2) 18, and the inverter 34 is controlled by an electronic control unit (ECU) 38 including a computer. The electronic control unit 38 receives various signals I. The various signals I includes a signal relating to the operating state of the engine 10 including an accelerator pedal operation amount; a signal relating to engine output torque obtained based on driving force supplied by the first motor-generator (MG1) 16 when the engine 10 drives the vehicle wheels via the planetary gear unit 14; a signal relating to a charge state of the battery 36; and other signals necessary for controlling the operation of the vehicle. The electronic control unit 38 performs computations based on the various signals I according to control programs incorporated therein, thereby controlling operating of each of the engine 10, the first motor-generator (MG1) 16, the second motor-generator (MG2) 18, and the inverter 34. Lean limit operation control of the engine according to the invention is performed according to a procedure shown in FIG. 2 as a flowchart.

Figure 2:
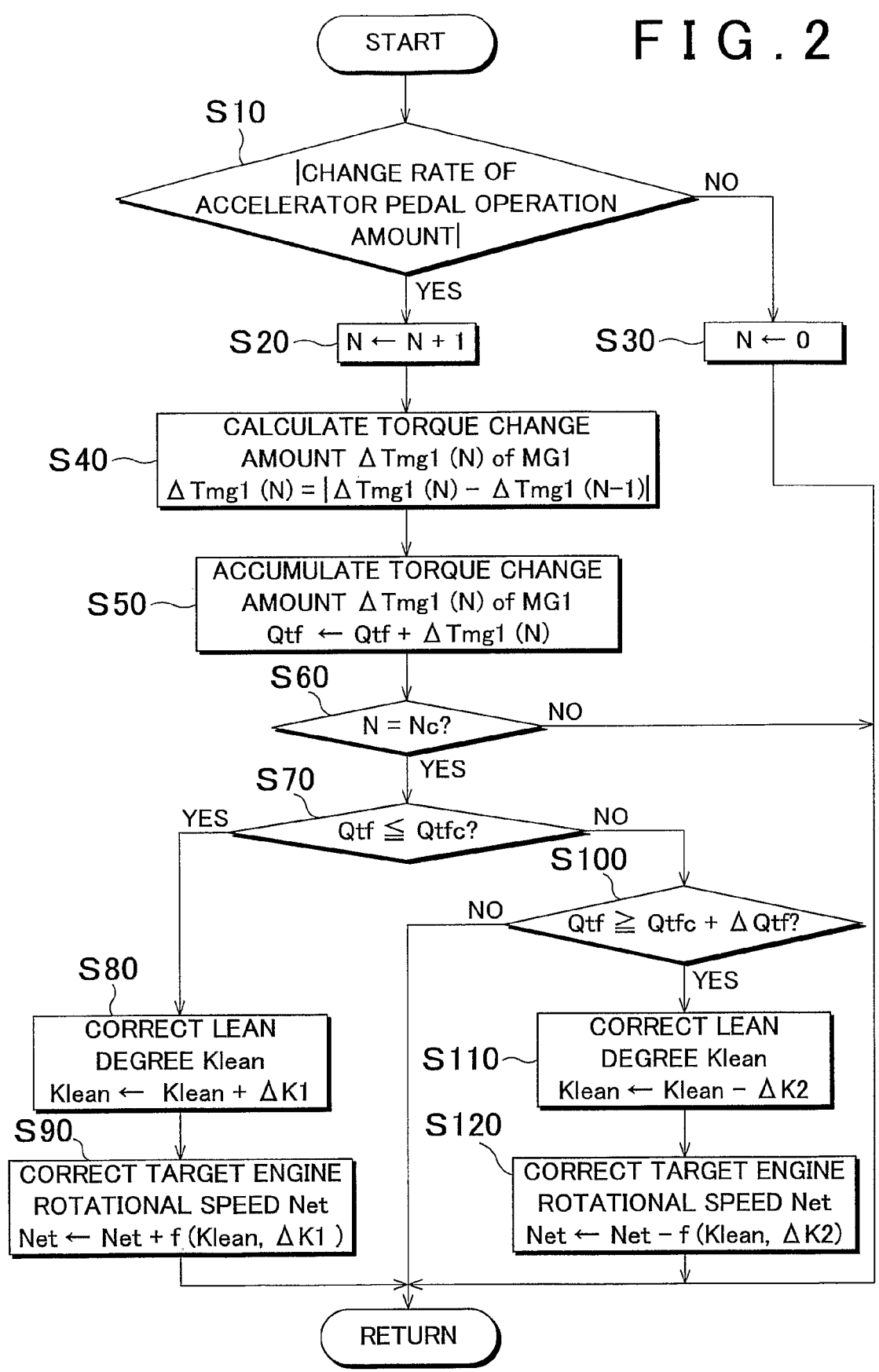
FIG. 2 is a flowchart showing an example of lean limit operation control of an engine according to the invention.

The control that is performed according to the flowchart shown in FIG. 2 is started upon closure of an ignition switch and start of operation of the vehicle. While the vehicle is operated, the control is repeatedly performed by a microcomputer in a cycle of several tens milliseconds to several hundreds milliseconds.

When the control is started, it is determined whether an absolute value of a change rate of the accelerator pedal operation amount is smaller than a predetermined limit value $\Delta Acc$ in step S10. When an affirmative determination is made in step S10 ("YES" in step S10), step S20 is performed. In step S20, a count value N is increased by one from a reset value 0. When a negative determination is made in step S10 ("NO" in step S10), step S30 is performed. In step S30, the count value N is reset to 0. Then, the control is terminated.

In step S40, a torque change amount $\Delta Tmg1(N)$ of the first motor-generator (MG1) 16 in a Nth control that is being performed at present is calculated as an absolute value of a difference between torque Tmg1 (N) of the first motor-generator (MG1) 16 in the present Nth control and torque Tmg1 (N−1) of the first motor-generator (MG1) 16 in a (N−1)th control that is performed last time. It can be considered that the vehicle speed is constant in a cycle of several tens milliseconds to several hundreds milliseconds. Therefore, when torque of the second motor-generator (MG2) 18 is maintained at a constant level, the calculated torque change amount of the first motor-generator (MG1) 16 corresponds to a change amount of the engine output torque.

Next, in step S50, an accumulated value Qtf is calculated by sequentially accumulating the torque change amount $\Delta Tmg1(N)$ of the first motor-generator (MG1) 16 that is obtained in step S40.

Next, in step S60, it is determined whether the count value N reaches a limit value Nc. When a negative determination is made in step S60 ("NO" in step S60), the control is returned to step S10, and then computations in the aforementioned steps are repeatedly performed. After the count value N reaches the predetermined value and an affirmative determination is made in step S60 ("YES" in step S60), step S70 is performed.

In step S70, it is determined whether the aforementioned accumulated value Qtf is equal to or smaller than a predetermined limit value Qtfc. The predetermined limit value Qtfc is used as a guide, and is set such that a lean degree of the engine operation can be increased, that is, the air-fuel ratio can be increased during the engine operation until the accumulated value Qtf reaches the predetermined limit value Qtfc. When an affirmative determination is made in step S70 ("YES" in step S70), step S80 is performed. In step S80, a lean degree Klean, which indicates a lean degree of the engine operation, is increased by a predetermined lean degree increase amount $\Delta K1$. The lean degree Klean is a target value during lean limit control of the engine performed by the electronic control unit 38. Using the lean degree Klean as the target value, the air-fuel ratio of the engine is separately controlled according to a lean limit operation control program for the engine that is incorporated in the electronic control unit 38.

Then, in step S90, a target engine rotational speed Net is increased by an increase amount f(Klean, $\Delta K1$) that is appropriately set as a function of the lean degree Klean and the lean degree increase amount $\Delta K1$. The engine rotational speed is separately controlled according to an engine rotational speed control program that is incorporated in the electronic control unit 38. However, in this embodiment, the engine rotational speed is controlled by controlling a rotational speed of the first motor-generator (MG1) 16 using the target engine rotational speed Net.

Figure 3:
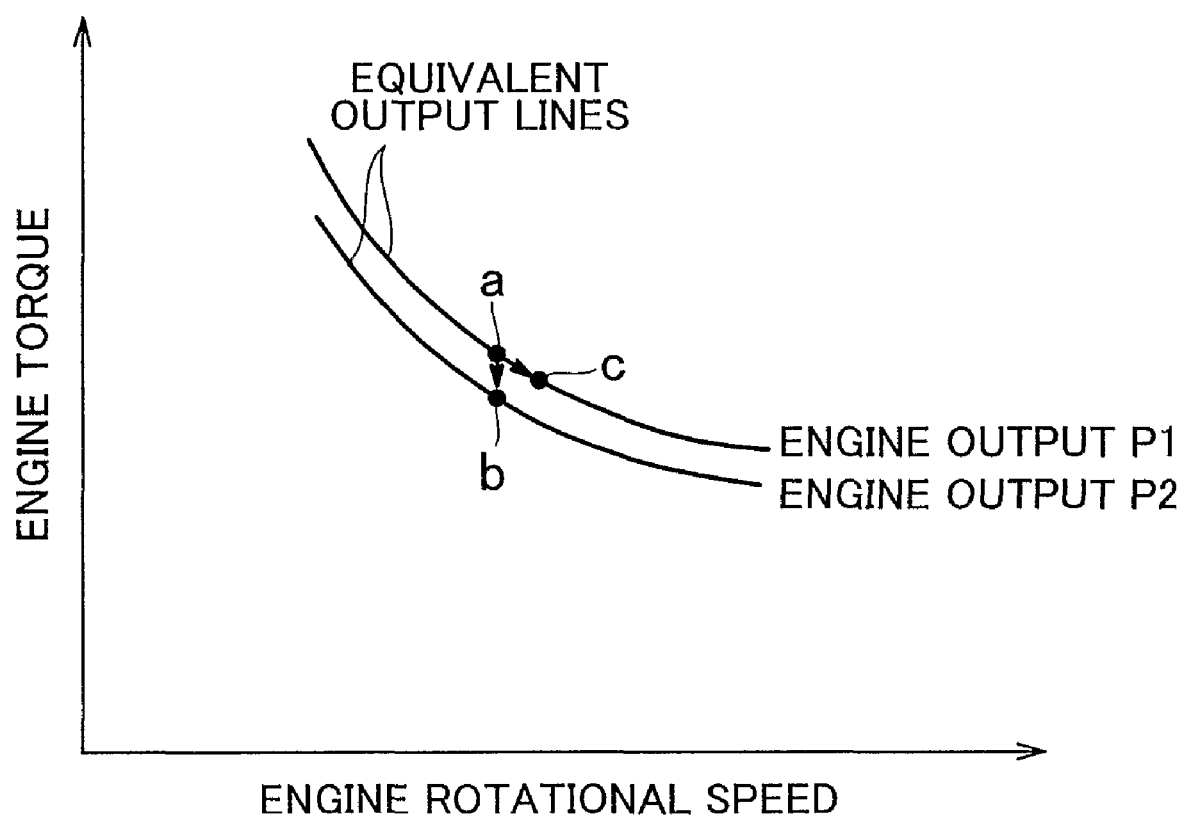
FIG. 3 is a graph showing equivalent output lines each of which indicates an engine output, using an engine rotational speed and engine torque as parameters.

FIG. 3 is a graph showing equivalent output lines each of which indicates an engine output, using an engine rotational speed and engine torque as parameters. There may be a case where when the engine is operated at a point "a" on an equivalent output line showing an engine output P1 in the graph in FIG. 3, the lean degree is increased, that is, the air-fuel ratio is increased. In this case, if no control is performed, the engine torque is decreased and the engine operation point moves from the point "a" to a point "b" on an equivalent output line showing an engine output P2 which is lower than the engine output P1. However, if the engine rotational speed is appropriately increased simultaneously with an increase in the lean degree, the engine operation point moves to a point "c" along the equivalent output line showing the engine output P1 in spite of the increase in the lean degree. Thus, the lean degree can be increased at a constant vehicle speed while the engine output is maintained at a constant level.

Referring to FIG. 2 again, when a negative determination is made in step S70 ("NO" in step S70), step S100 is performed. In step S100, it is determined whether the accumulated value Qtf is larger than the aforementioned limit value Qtf by a small value $\Delta Qtf$. The value $\Delta Qtf$ is an amount of hysteresis that is used for preventing hunting during this kind of limit control. When a negative determination is made in step S100 ("NO" in step S100), the lean degree is not corrected. When an affirmative determination is made in step S100 ("YES" in step S100), step S110 is performed. In step S110, the lean degree is decreased by a small lean degree decrease amount $\Delta K2$. In this case, in step S120, the target engine rotational speed Net is decreased by a decrease amount f(Klean, $\Delta K2$) that is appropriately set as a function of the lean degree Klean and the lean degree decrease amount $\Delta K2$. Thus, if the air-fuel ratio exceeds the lean limit due to external disturbance, the air-fuel ratio is decreased so as to be lower than the lean limit.

Although an exemplary embodiment of the invention has been described in detail, it is apparent to persons skilled in the art that various modifications can be made to the embodiment in the scope of the invention.

The invention claimed is:

1. A hybrid vehicle comprising:
a differential connection portion which mutually connects an engine, a motor-generator, and a drive wheel; and
a control device which performs lean limit control of the engine, and which maintains an output of the engine at a constant level by increasing/decreasing an engine rotational speed and decreasing/increasing a rotational speed of the motor-generator in accordance with a decrease/increase in engine torque.

2. The hybrid vehicle according to claim 1, wherein when a change amount of the engine torque is equal to or smaller than a predetermined first limit value, the control device gradually increases an air-fuel ratio in a lean region and gradually increases the engine rotational speed at the same time.

3. The hybrid vehicle according to claim 2, wherein when the change amount of the engine torque is equal to or larger than a predetermined second limit value which is larger than the first limit value, the control device gradually decreases the air-fuel ratio in the lean region and gradually decreases the engine rotational speed at the same time.

4. The hybrid vehicle according to claim 3, wherein when the change amount of the engine torque is equal to or smaller than the first limit value, the control device gradually increases the air-fuel ratio and the engine rotational speed on a condition that a change rate of an accelerator pedal operation amount is equal to or smaller than a predetermined limit value.

5. The hybrid vehicle according to claim 4, wherein the control device determines that the change amount of the engine torque is equal to or smaller than the first limit value based on a fact that an accumulated value is equal to or smaller than a predetermined limit value, the accumulated value being obtained by accumulating, during a predetermined detection period, an absolute value of the change amount of the engine torque in a predetermined time.

6. The hybrid vehicle according to claim 5, wherein the engine torque is decreased with an increase in an air-fuel ratio in a lean region, and the engine torque is increased with a decrease in the air-fuel ratio in the lean region.

7. The hybrid vehicle according to claim 4, wherein the engine torque is decreased with an increase in an air-fuel ratio in a lean region, and the engine torque is increased with a decrease in the air-fuel ratio in a lean region.

8. The hybrid vehicle according to claim 3, wherein the control device determines that the change amount of the engine torque is equal to or smaller than the first limit value based on a fact that an accumulated value is equal to or smaller than a predetermined limit value, the accumulated value being obtained by accumulating, during a predetermined detection period, an absolute value of the change amount of the engine torque in a predetermined time.

9. The hybrid vehicle according to claim 8, wherein the engine torque is decreased with an increase in an air-fuel ratio in a lean region, and the engine torque is increased with a decrease in the air-fuel ratio in the lean region.

10. The hybrid vehicle according to claim 3, wherein the engine torque is decreased with an increase in an air-fuel ratio in a lean region, and the engine torque is increased with a decrease in the air-fuel ratio in the lean region.

11. The hybrid vehicle according to claim 2, wherein when the change amount of the engine torque is equal to or smaller than the first limit value, the control device gradually increases the air-fuel ratio and the engine rotational speed on a condition that a change rate of an accelerator pedal operation amount is equal to or smaller than a predetermined limit value.

12. The hybrid vehicle according to claim 11, wherein the control device determines that the change amount of the engine torque is equal to or smaller than the first limit value based on a fact that an accumulated value is equal to or smaller than a predetermined limit value, the accumulated value being obtained by accumulating, during a predetermined detection period, an absolute value of the change amount of the engine torque in a predetermined time.

13. The hybrid vehicle according to claim 12, wherein the engine torque is decreased with an increase in an air-fuel ratio in a lean region, and the engine torque is increased with a decrease in the air-fuel ratio in the lean region.

14. The hybrid vehicle according to claim 11, wherein the engine torque is decreased with an increase in an air-fuel ratio in a lean region, and the engine torque is increased with a decrease in the air-fuel ratio in the lean region.

15. The hybrid vehicle according to claim 2, wherein the control device determines that the change amount of the engine torque is equal to or smaller than the first limit value based on a fact that an accumulated value is equal to or smaller than a predetermined limit value, the accumulated value being obtained by accumulating, during a predetermined detection period, an absolute value of the change amount of the engine torque in a predetermined time.

16. The hybrid vehicle according to claim 15, wherein the engine torque is decreased with an increase in an air-fuel ratio in a lean region, and the engine torque is increased with a decrease in the air-fuel ratio in the lean region.

17. The hybrid vehicle according to claim 2, wherein the engine torque is decreased with an increase in an air-fuel ratio in a lean region, and the engine torque is increased with a decrease in the air-fuel ratio in the lean region.

18. The hybrid vehicle according to claim 1, wherein the engine torque is decreased with an increase in an air-fuel ratio in a lean region, and the engine torque is increased with a decrease in the air-fuel ratio in the lean region.

19. A hybrid vehicle comprising;
connection means for differentially connecting an engine, a motor-generator, and a drive wheel; and
a control device which performs lean limit control of the engine, and which maintains an output of the engine at a constant level by increasing/decreasing an engine rotational speed and decreasing/increasing a rotational speed of the motor-generator in accordance with a decrease/increase in engine torque.

* * * * *